US011985339B2

(12) United States Patent
Ouedraogo et al.

(10) Patent No.: US 11,985,339 B2
(45) Date of Patent: May 14, 2024

(54) METHOD AND APPARATUS FOR ENCAPSULATING IMAGES OR SEQUENCES OF IMAGES WITH PROPRIETARY INFORMATION IN A FILE

(71) Applicant: CANON KABUSHIKI KAISHA, Tokyo (JP)

(72) Inventors: Naël Ouedraogo, Maure de Bretagne (FR); Frédéric Maze, Langan (FR); Jonathan Taquet, Talensac (FR); Hervé Ruellan, Rennes (FR); Franck Denoual, Saint Domineuc (FR); Masahiko Takaku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/324,268

(22) Filed: May 26, 2023

(65) Prior Publication Data
US 2023/0300349 A1    Sep. 21, 2023

Related U.S. Application Data

(62) Division of application No. 17/044,561, filed as application No. PCT/EP2019/057430 on Mar. 25, 2019, now Pat. No. 11,711,526.

(30) Foreign Application Priority Data

Apr. 5, 2018  (GB) ..................... 1805712
Apr. 5, 2018  (GB) ..................... 1805720
Jul. 4, 2018   (GB) ..................... 1811008

(51) Int. Cl.
*H04N 19/179* (2014.01)
*H04N 19/117* (2014.01)
(Continued)

(52) U.S. Cl.
CPC ......... *H04N 19/179* (2014.11); *H04N 19/117* (2014.11); *H04N 19/46* (2014.11); *H04N 19/70* (2014.11); *H04N 21/84* (2013.01)

(58) Field of Classification Search
CPC .... H04N 19/117; H04N 19/179; H04N 19/46; H04N 19/70; H04N 21/84; H04N 21/85406
(Continued)

(56) References Cited

U.S. PATENT DOCUMENTS 7,868,793 B2    1/2011   Bellessort et al.
8,219,901 B2    7/2012   Denoual
(Continued)

FOREIGN PATENT DOCUMENTS

WO    WO-2016128419 A1 *  8/2016  ........... H04L 65/607

OTHER PUBLICATIONS

Vinod Kumar Malamal Vadakital, et al., "Derived visual tracks for ISOBMFF and HEIF," ISO/IEC JTC1/SC29/WG11, MPEG2016/M37869, 11. MPEG Meeting, Feb. 2016, San Diego, CA, Feb. 2016, pp. 1-6.
(Continued)

*Primary Examiner* — Christopher S Kelley
*Assistant Examiner* — Ana Picon-Feliciano
(74) *Attorney, Agent, or Firm* — Venable LLP

(57) ABSTRACT

A method of encapsulating entities in a file, wherein the method comprises for at least one entity: generating a grouping data structure associated with at least one of the entities, and indicating that the at least one of the entities belong to a same group; encapsulating the grouping data structure and the entities in the file; wherein the grouping data structure is a proprietary grouping data structure comprising an universally unique identifier identifying the type of the proprietary grouping.

23 Claims, 6 Drawing Sheets

(51) Int. Cl.
*H04N 19/46* (2014.01)
*H04N 19/70* (2014.01)
*H04N 21/84* (2011.01)

(58) Field of Classification Search
USPC .................................................. 375/240.01
See application file for complete search history.

(56) References Cited

U.S. PATENT DOCUMENTS

| | | | |
|---|---|---|---|
| 8,234,288 B2 | 7/2012 | Ruellan | |
| 8,311,128 B2 | 11/2012 | Le Floch et al. | |
| 8,341,129 B2 | 12/2012 | Denoual et al. | |
| 8,379,670 B2 | 2/2013 | Le Floch et al. | |
| 8,381,097 B2 | 2/2013 | Ruellan et al. | |
| 8,698,657 B2 | 4/2014 | Fablet et al. | |
| 8,743,961 B2 | 6/2014 | Vandame et al. | |
| 8,788,509 B2 | 7/2014 | Ruellan et al. | |
| 8,812,724 B2 | 8/2014 | Nassor et al. | |
| 8,914,718 B2 | 12/2014 | Denoual et al. | |
| 8,930,924 B2 | 1/2015 | Fablet et al. | |
| 8,972,851 B2 | 3/2015 | Ruellan et al. | |
| 9,106,935 B2 * | 8/2015 | Hwang | H04N 21/6543 |
| 9,208,256 B2 | 12/2015 | Fablet et al. | |
| 9,367,528 B2 | 6/2016 | Bellessort et al. | |
| 2008/0320031 A1 | 12/2008 | Denoual | |
| 2009/0254882 A1 | 10/2009 | Ruellan | |
| 2009/0307258 A1 * | 12/2009 | Priyadarshi | H04N 21/8547 |
| | | | 707/999.102 |
| 2010/0153395 A1 | 6/2010 | Hannuksela et al. | |
| 2018/0007407 A1 | 1/2018 | Maze et al. | |
| 2018/0109817 A1 | 4/2018 | Wang et al. | |
| 2018/0199044 A1 | 7/2018 | Wang et al. | |
| 2018/0277164 A1 | 9/2018 | Wang | |
| 2019/0052937 A1 * | 2/2019 | Malamal Vadakital | |
| | | | H04L 65/70 |

OTHER PUBLICATIONS

David Singer, et al., "Technologies under Consideration for ISOBMFF," ISO/IEC JTC1/SC29/WMG11 MPEG2018/N17575, 123. MPEG Meeting, Apr. 2018, San Diego, CA, pp. 1-56.

Franck Denoual, et al., "On Derived Tracks for ISOBMFF," ISO/IEC JTC1/SC29/WG11, MPEG2018/m43551, 123. MPEG Meeting, Jul. 2018, Ljubljana, SL, pp. 1-6.

Miska M. Hannuksela, et al., "Overview of the High Efficiency Image File Format," Joint Collaborative Team on Video Coding (JCT-VC) of ITU-T SG 16 WP 3 and ISO/IEC JTC1/SC29/WG11, Document JCTVC-V0072, 22. JCT-VC Meeting, Oct. 2015, pp. 1-12.

Jul. 8, 2019 International Search Report and Written Opinion in International Patent Appln. No. PCT/EP2019/057430.

Dec. 21, 2020 Great Britain Official Action in Great Britain Patent Appln. No. 1811008.1.

* cited by examiner

METHOD AND APPARATUS FOR ENCAPSULATING IMAGES OR SEQUENCES OF IMAGES WITH PROPRIETARY INFORMATION IN A FILE

This application is a divisional of U.S. patent application Ser. No. 17/044,561 filed Oct. 1, 2020, which was the National Stage of International Patent Appln. No. PCT/EP2019/057430 filed Mar. 25, 2019.

FIELD OF THE INVENTION

The present disclosure concerns a method and a device for encapsulating images or sequences of images with proprietary information in a file.

BACKGROUND OF INVENTION

The International Standard Organization Base Media File Format (ISO BMFF, ISO/IEC 14496-12) is a well-known flexible and extensible format that describes encoded timed and non-timed media data bit-streams either for local storage or transmission via a network or via another bit-stream delivery mechanism. An example of extensions is ISO/IEC 14496-15 that describes encapsulation tools for various NAL (Network Abstraction Layer) unit based video encoding formats. Examples of such encoding formats are AVC (Advanced Video Coding), SVC (Scalable Video Coding), HEVC (High Efficiency Video Coding), and L-HEVC (Layered HEVC). Another example of file format extensions is ISO/IEC 23008-12 that describes encapsulation tools for still images or sequence of still images such as HEVC Still Image. This file format is object-oriented. It is composed of building blocks called boxes (or data structures characterized by a four characters code) that are sequentially or hierarchically organized and that define parameters of the encoded timed media data bit-stream such as timing and structure parameters. In the file format, the overall presentation is called a movie. The movie is described by a movie box (with the four character code 'moov') at the top level of the media or presentation file. This movie box represents an initialization information container containing a set of various boxes describing the presentation. It is logically divided into tracks represented by track boxes (with the four character code 'trak'). Each track (uniquely identified by a track identifier (track_ID)) represents a timed sequence of media data belonging to the presentation (frames of video, for example). Within each track, each timed unit of data is called a sample; this might be a frame of video, audio or timed metadata. Samples are implicitly numbered in sequence. The actual sample data are stored in boxes called Media Data Boxes (with the four character code 'mdat') at the same level as the movie box. The movie can be organized temporally as a movie box containing information for the whole presentation followed by a list of couple movie fragment and Media Data boxes. Within a movie fragment (box with the four character code 'moof') there is a set of track fragments (box with the four character code 'traf'), zero or more per movie fragment. The track fragments in turn contain zero or more track run boxes ('trun'), each of which document a contiguous run of samples for that track fragment.

In the file format, a media or presentation file may also contain one or more static items (e.g. one or more still images) described within a meta box ('meta') at file level, i.e. at same level as the movie box, or in the movie box, or in a track box within the movie box. This meta box may contain descriptive information describing static items, this descriptive information being organized in several boxes (for instance, the list of items in an item information box ('iinf') and the location (in data boxes) of data items in an item location box ('iloc')), each item being uniquely identified by an item identifier (item_ID). The actual item data are stored either in an item data box ('idat') in the meta box or in a media data box ('mdat') at file top level.

An ISOBMFF file may contain multiple encoded timed media data bit-streams or sub-parts of encoded timed media data bit-streams forming multiple tracks (also noted sub-picture tracks for video content) and/or multiple static items. ISOBMFF and its extensions comprise several grouping mechanisms to group together tracks, static items, or samples. A group typically shares common semantic and/or characteristics.

For instance, ISOBMFF comprises an entity group mechanism, a track group mechanism, and a sample grouping mechanism. The entity grouping mechanism can be used to indicate that tracks and/or static items are grouped according to an indicated grouping type or semantic. The track grouping mechanism can be used to indicate that tracks are grouped according to an indicated grouping type or semantic. The sample grouping mechanism can be used to indicate that certain properties associated with an indicated grouping type or semantic apply to an indicated group of samples within a track.

ISOBMFF provides a specific type of track, called derived track, that can be used to define a track based on one or several reference tracks or items. A derived track does not comprise any actual image data. Instead, transformation operators are stored in the samples of the derived track. The actual image data of a derived track are obtained by applying the transformation operators to the samples of the reference tracks or to the reference items. The ISOBMFF standard provides predefined transformation operators, each associated with a predefined four characters code. Transformation operators stored in a derived track sample can be marked as essential or not essential. A decoder decoding a derived track comprising an unknown transformation operator marked as essential triggers an error and stop the decoding of the derived track. An unknown transformation operator that is not marked as essential is simply ignored at decoding, it does not stop the decoding of the derived track.

A mechanism is provided to describe the list of transformation operators used in a derived track. This description is provided in the metadata describing the derived track. These metadata are typically provided to a decoder in an initialization segment, which allows the decoder to get the knowledge of all the transformation operators used in a derived track before downloading any actual data segment of the derived track. Unfortunately, the information that a particular transformation operator used in a derived track is essential or not is not provided in the metadata describing the track. Moreover, the standard does not provide any mechanism to allow the encoding of proprietary transformation operators beside predefined transformation operators.

High Efficiency Image File Format (HEIF) is a file format for individual images and image sequences. It was developed by the Moving Picture Experts Group (MPEG) and is defined by MPEG-H Part 12 (ISO/IEC 23008-12). Exchangeable image file format (officially Exif, according to JEIDA/JEITA/CIPA specifications) is a standard that specifies the formats for images, sound, and ancillary tags used by digital cameras (including smartphones), scanners and other systems handling image and sound files recorded by digital cameras.

The HEIF standard provides mechanism to store and describe still images called items and sequences of images in tracks. Sequences of images in tracks may be timed or not. The word entity is used to refer indistinctly to items and tracks. The HEIF standard provides a grouping mechanism to group entities. This grouping mechanism provides predefined types of group, each associated with a predefined four characters code. The HEIF standard does not provide a way for using proprietary types of group for entities.

SUMMARY OF THE INVENTION

The present invention has been devised to address one or more of the foregoing concerns. It concerns mechanisms to describe proprietary types of group of entities as well as proprietary transformation operators to be used in derived tracks. It should be noted that while HEIF was originally a standard dedicated to the encapsulation of still images and ISOBMFF was originally a standard dedicated to the encapsulation of video data, both standards tend to evolve by incorporating mechanisms from the other standard. HEIF standard now incorporates sequences of images in tracks similar to the ISOBMFF tracks while ISOBMFF standard now incorporates still images in items similar to the items of HEIF. The different embodiments of the invention described in this document, while being described in the context of HEIF or ISOBMFF standards may be applied similarly in both standards.

According to a first aspect of the invention, it is provided a method of encapsulating entities in a file, wherein the method comprises for at least one entity:
 generating a grouping data structure associated with at least one of the entities, and indicating that the at least one of the entities belong to a same group;
 encapsulating the grouping data structure and the entities in the file; wherein:
 the grouping data structure is a proprietary grouping data structure comprising an universally unique identifier identifying the type of the proprietary grouping.

According to an embodiment, the universally unique identifier is a parameter of the proprietary grouping data structure.

According to an embodiment, the proprietary grouping data structure is an 'uuid' box according to HEIF or ISOBMFF standards.

According to an embodiment, the proprietary grouping data structure comprises a dedicated grouping type parameter indicating a proprietary grouping data structure, and the universally unique identifier is an attribute of the proprietary grouping data structure.

According to an embodiment, the proprietary grouping data structure is a full box according to HEIF or ISOBMFF standards.

According to another aspect of the invention, it is provided a method of reading entities in a file, wherein the method comprises for at least one entity:
 reading entities and a grouping data structure associated with at least one of the entities indicating that the at least one of the entities belong to a same group;
 wherein:
 the grouping data structure is a proprietary grouping data structure comprising an universally unique identifier identifying the type of the proprietary grouping.

According to an embodiment, the universally unique identifier is a parameter of the proprietary grouping data structure.

According to an embodiment, the proprietary grouping data structure is an 'uuid' box according to HEIF or ISOBMFF standards.

According to an embodiment, the proprietary grouping data structure comprises a dedicated grouping type parameter indicating a proprietary grouping data structure, and the universally unique identifier is an attribute of the proprietary grouping data structure.

According to an embodiment, the proprietary grouping data structure is a full box according to HEIF or ISOBMFF standards.

According to another aspect of the invention, it is provided a method of encapsulating sequences of images in a file, wherein the method comprises for at least one sequence of images:
 generating a derived track comprising derived samples defined as a list of transformation operators to be applied to one or more input images, some of the transformation operators being marked as essential;
 generating a description data structure in a metadata part of the derived track comprising a list of transformation operators used in the derived track;
 encapsulating the derived track and the input images in the file; wherein:
 the description data structure comprises the information indicating which transformation operator in the list is essential.

According to an embodiment, the list of transformation operators is separated in a first list of essential transformation operators and a second list of non-essential operators.

According to an embodiment, the list of transformation operators comprises for each transformation operators a flag indicating if the transformation operator is essential or not.

According to another aspect of the invention, it is provided a method of encapsulating sequences of images in a file, wherein the method comprises for at least one sequence of images:
 generating a derived track comprising derived samples defined as a list of transformation operators to be applied to one or more input images;
 generating a description data structure in a metadata part of the derived track comprising a list of transformation operators used in the derived track;
 encapsulating the derived track and the input images in the file;
 wherein:
 the list of transformation operators comprises proprietary transformation operators identified by an universally unique identifier.

According to an embodiment, the list of transformation operators comprises for each transformation operator a flag indicating if the transformation operator is identified with a four characters code or by a universally unique identifier.

According to an embodiment, the list of transformation operators is separated in a first list of transformation operators identified with a four characters code and a second list of transformation operators identified with a universally unique identifier.

According to an embodiment, the list of transformation operators comprises for each transformation operator a flag indicating if the transformation operator is essential or not, and a flag indicating if the transformation operator is identified with a four characters code or by a universally unique identifier.

According to another aspect of the invention, it is provided a method of reading sequences of images in a file, wherein the method comprises for at least one image:

reading a derived track comprising derived samples defined as a list of transformation operators to be applied to one or more input images, some of the transformation operators being marked as essential;

reading a description data structure in a metadata part of the derived track comprising a list of transformation operators used in the derived track;

wherein the method further comprises:

determining if each transformation operator is essential based on an information in the description data structure indicating which transformation operator in the list is essential.

According to an embodiment, the list of transformation operators comprises for each transformation operators a flag indicating if the transformation operator is essential or not.

According to another aspect of the invention, it is provided a method of reading sequences of images in a file, wherein the method comprises for at least one image:

reading a derived track comprising derived samples defined as a list of transformation operators to be applied to one or more input images;

reading a description data structure in a metadata part of the derived track comprising a list of transformation operators used in the derived track;

wherein:

the list of transformation operators comprises proprietary transformation operators identified by an universally unique identifier.

According to an embodiment, the list of transformation operators comprises for each transformation operator a flag indicating if the transformation operator is identified with a four characters code or by a universally unique identifier.

According to an embodiment, the list of transformation operators is separated in a first list of transformation operators identified with a four characters code and a second list of transformation operators identified with a universally unique identifier.

According to an embodiment, the list of transformation operators comprises for each transformation operator a flag indicating if the transformation operator is essential or not, and a flag indicating if the transformation operator is identified with a four characters code or by a universally unique identifier.

According to another aspect of the invention, it is provided a computer program product for a programmable apparatus, the computer program product comprising a sequence of instructions for implementing a method according to the invention, when loaded into and executed by the programmable apparatus.

According to another aspect of the invention, it is provided a computer-readable storage medium storing instructions of a computer program for implementing a method according to the invention.

According to another aspect of the invention, it is provided a computer program which upon execution causes the method of the invention to be performed.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CDROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Figure 1:
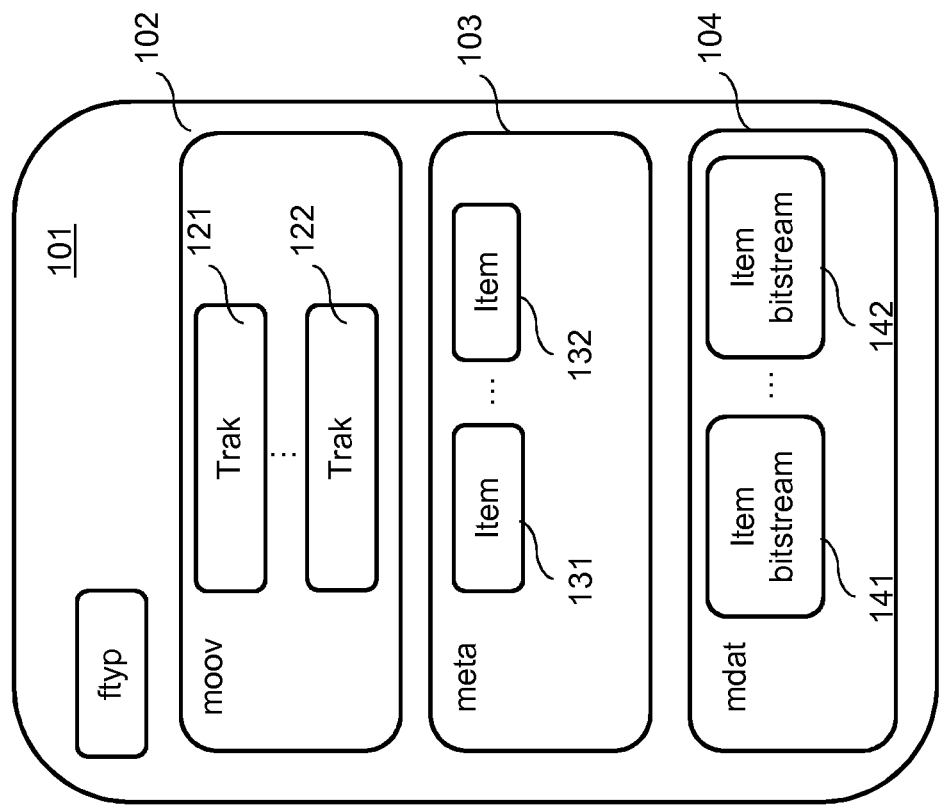
FIG. 1 illustrates an example of an HEIF file that contains several still images.

The HEVC standard defines a profile for the encoding of still images and describes specific tools for compressing single still images or bursts of still images. An extension of the ISO Base Media File Format (ISOBMFF) used for such kind of image data has been proposed for inclusion into the ISO/IEC 23008 standard, in Part 12, under the name: "HEIF or High Efficiency Image File Format "Image File Format".

HEIF (High Efficiency Image File Format) is a standard developed by the Moving Picture Experts Group (MPEG) for storage and sharing of images and image sequences.

The MIAF (Multi-Image Application Format) is a standard developed by MPEG into ISO/IEC 23000 standard part 12 that defines a set of constraints on HEIF specification to simplify the format.

The HEIF and MIAF standards cover two forms of storage corresponding to different use cases:

the storage of image sequences, with timing that is optionally used at the decoder, and in which the images may be dependent on other images, and the storage of single images, and collections of independently coded images.

In the first case, the encapsulation is close to the encapsulation of the video tracks in the ISO Base Media File Format (see document «Information technology—Coding of audio-visual objects—Part 12: ISO base media file format», ISO/IEC 14496-12:2014, Fifth edition, Avril 2015), and the similar tools and concepts are used, such as the 'trak' boxes and the sample grouping for description. The 'trak' box is a file format box that contains sub boxes for describing a track, that is to say, a timed sequence of related samples.

Boxes, also called containers, are data structures provided to describe the data in the files. Boxes are object oriented building block for describing meta data in an image file.

In the second case, a set of ISOBMFF boxes, the 'meta' boxes are used. These boxes and their hierarchy offer less description tools than the 'track' boxes and relate to "information items" or "items" instead of related samples. It is to be noted that the wording 'box' and the wording 'container' may be both used with the same meaning to refer to data structures that contain metadata describing the organization or/and properties of the image data in the file.

In this invention, proprietary information consists in description data for which the syntax is unknown from other manufacturers/makers or other standard HEIF/MIAF or ISOBMFF readers. Proprietary information are extensions to the standard defined by a specific vendor/manufacturer/maker. This proprietary information may be used by a vendor to enrich the standard at dedicated location that are predefined in the standard to maintain the compatibility with other vendors implementation. Typically, an implementation by another vendor will ignore any proprietary information it does not know. For example, proprietary information inserted in a file by a device of a manufacturer may be later reused by another device of the same manufacturer to optimize the processing of an image or a sequence of images.

A universally unique identifier (UUID) is a 128-bit number used to identify information in computer systems. When generated according to the standard methods, UUIDs are for practical purposes unique, without depending for their uniqueness on a central registration authority or coordination between the parties generating them, unlike most other numbering schemes. While the probability that a UUID will be duplicated is not zero, it is close enough to zero to be negligible. UUIDs are standardized by the Open Software Foundation (OSF) as part of the Distributed Computing Environment (DCE). UUIDs are documented as part of ISO/IEC 11578:1996 "Information technology—Open Systems Interconnection—Remote Procedure Call (RPC)" and more recently in ITU-T Rec. X.667|ISO/IEC 9834-8:2005. UUIDs may be used advantageously in embodiments of the invention to identify proprietary information.

FIG. 1 illustrates an example of an HEIF file 101 that contains several still images. This file contains a first 'moov' box 102 that describes several tracks 121 and 122. Typically, the track 121 is a 'pict' track designed to describe a set of pictures for which the temporal information is not necessarily meaningful and 122 is a 'vide' track designed to describe video content. Both these tracks describes a series of image samples, an image sample being a set of pixels captured at the same time, for example a frame of a video sequence. Main difference between the two tracks is that in 'pict' tracks the timing information is not necessarily meaningful whereas for 'vide' track the timing information is intended to constraint the timing of the display of the samples.

In a second container, the HEIF file 101 describes several single images as different items 131 and 132 of the 'meta' box 103. The 'mdat' container 104 stores the encoded images corresponding to these items as represented by the data portion 141 and 142. The 'item' boxes aim at describing the organization of the encoded data in the 'mdat' box and to provide some properties of the encoded images.

The purpose of HEIF file 101 is to describe the different alternatives available to store multiple samples in one HEIF file. Of course, there is no requirements to use 'pict' and 'video' tracks with items in the same HEIF file. For instance, we may store the multiple image either as item or as a track of samples that can be a 'pict' track or a 'vide' track. The actual choice is typically made by the application generating the file according to the type of images and the contemplated usage of the file.

Figure 2:
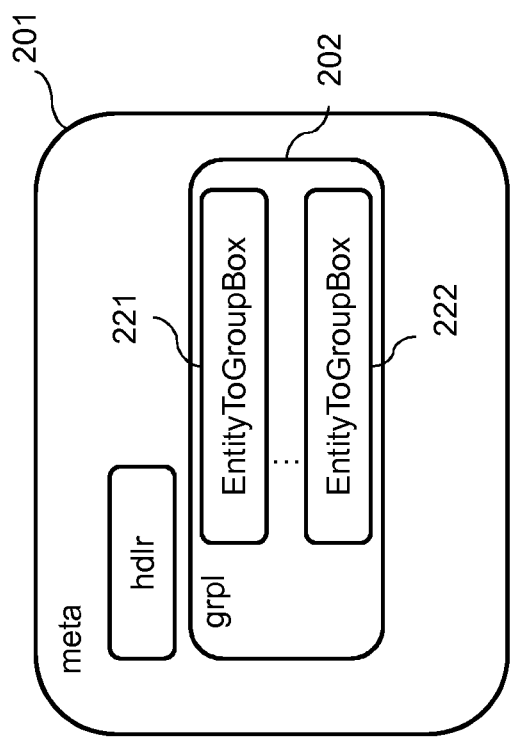
FIG. 2 illustrates grouping types description in an HEIF file.

FIG. 2 illustrates the description of grouping of entities according to HEIF standard. Grouping of entities is usually described using EntityToGroupBoxes 221, and 222 contained in a GroupsListBox 202, the GroupsListBox being itself contained in a MetaBox 201. The GroupsListBox ('grpl') contains all the boxes that describe the groups of entities specified for the file. It is defined as containing a set of full boxes, each called an EntityToGroupBox. Entities may be items or tracks identified by their item_id or track_id, referred as an entity_id. The entities in an entity group share a particular characteristic or have a particular relationship, as indicated by the grouping_type parameter of the EntityToGroupBox. The grouping_type is a four character code identifying the type of the group. GroupsListBox and EntityToGroupBox are defined as below:

```
Box Type:        'grpl'
Container:       MetaBox that is not contained in
                 AdditionalMetadataContainerBox
Mandatory:       No
Quantity:        Zero or One
aligned(8) class GroupsListBox extends Box('grpl') {
}
Box Type:        As specified below with the grouping_type
                 value for the EntityToGroupBox
Container:       GroupsListBox
Mandatory:       No
Quantity:        One or more
aligned(8) class EntityToGroupBox(grouping_type, version,
flags)
extends FullBox(grouping_type, version, flags) {
   unsigned int(32) group_id;
   unsigned int(32) num_entities_in_group;
   for(i=0; i<num_entities_in_group; i++)
      unsigned int(32) entity_id;
// the remaining data may be specified for a particular
grouping_type
}
```

Where the box type (grouping_type) indicates the grouping type of the entity group. Version and flags are the usual parameters of a full box. Version is intended to allow evolution of the definition of the box. By giving a version number, it is possible to have different definitions of the box corresponding to different version number. The flags parameter allows to define a number of flags that can be passed to the box. The group_id is an identifier of the group in the file. Num_entities_in_group gives the number of entities comprised in the group. Then, for each entity, its entity_id, identifying the entity is given along with potential other information that depend on the type of the group as given by the grouping_type parameter.

The HEIF standard provides for a closed list of predefined grouping-types. It is therefore impossible to define proprietary types of group according to the current standard. It may be useful to allow the definition of a proprietary information corresponding to proprietary types of groups.

In one embodiment, the GroupsListBox ('grpl') is modified to not only contain a set of full boxes but also boxes of type 'uuid'. In this embodiment, the GroupsListBox ('grpl') may then contains:
   a set of full boxes, each called an EntityToGroupBox, with four-character codes denoting a defined grouping type, and/or a set of user-extended 'uuid' boxes, with an extended type denoting a user-extended grouping type.

The standard provides the basic box with an optional UUID parameter that allows the definition of user extended or vendor specific boxes called 'uuid' boxes. The actual definition of the content of a user extended box depends on the value of the UUID given as parameter. This mechanism allows a vendor to define proprietary boxes by specifying a dedicated UUID and the corresponding definition for the content of the user extended box.

In this embodiment, a vendor can specify a UUID corresponding to an extended_grouping_type for the proprietary group to be defined. Then, the vendor defines the content of the corresponding user extended box according to his needs. In many cases, this content is typically similar to the EntityToGroupBox defined by the standard with potential additional information depending on the extended_grouping_type.

A reader parsing the file and reading a user extended 'uuid' box with an unknown uuid shall ignore and skip the user extended 'uuid' box.

In an alternative embodiment, a new dedicated EntityToGroupBox grouping_type is defined for instance 'guid'. This new grouping_type indicates that the grouping is a proprietary or user-extended grouping denoted by an extended_grouping_type parameter. This new EntityToGroupBox may be defined as follows:

```
aligned(8) class EntityToGroupBox('guid', version, flags)
extends FullBox('guid', version, flags) {
    unsigned int(32) group_id;
    unsigned int(32) num_entities_in_group;
    for(i=0; i<num_entities_in_group; i++)
        unsigned int(32) entity_id;
        unsigned int(8)[16] extended_grouping_type;
    // the remaining data may be specified for a particular
    extended_grouping_type
}
```

The new grouping_type is defined as follows:
'guid': The items and tracks mapped to this grouping are grouped according to a semantic indicated by an additional attribute extended_grouping_type. The extended grouping type is a full 16-byte UUIDs that identifies a proprietary group extension. EntityToGroupBoxes of type 'guid' with an unrecognized extended grouping type shall be ignored and skipped by a reader parsing the file.

According to this embodiment, an HEIF file can contain some proprietary information corresponding to proprietary types of grouping. A vendor can define any grouping types of items or tracks according to his needs. This embodiment of the invention can also be implemented in corresponding grouping mechanisms in the ISOBMFF standard with the same advantages.

As an alternative, rather than ignoring a proprietary group with an unrecognized extended grouping type, an expected behaviour of the parser may be specified when the extended grouping type is unknown. For instance, a 'guid' could be considered as an alternate 'altr' group when the extended grouping type is unknown, i.e., the items and tracks mapped to this grouping are, by default, alternatives to each other, and only one of them should be played or processed. Similarly, another proprietary grouping type 'igui' with same additional attribute extended_grouping_type can be defined with another associated default semantic when the extended grouping type is unknown. For instance, when a parser does not understand the extend grouping type of the 'igui' group, it shall ignore all the items belonging to this group (and not to another group).

As an alternative for specifying the expected behaviour of the parser, a new field may be added to the 'guid' EntityToGroupBox, containing the grouping type corresponding to the default behavior.

This field may be located after the extended_grouping_type field and be defined as follows:
unsigned int(32) default_behaviour;
A specific value, 'igno', may be defined to indicate that the default behavior for the proprietary group is to ignore all the items belonging to it. Other specific values may also be defined to guide the default parser behaviour: e.g. 'alte' to indicate all items are alternatives, only one shall be selected, 'firs' to indicate the only first one shall be selected, This field may be made optional by defining two versions of the EntityToGroupBox box: one containing this field, another not containing it.

As another alternative, the definition of a full box may be modified to allow an optional user extended type as follows:

```
aligned(8) class FullBox(unsigned int(32) boxtype,
    unsigned int(8) v, bit(24) f,
    optional unsigned int(8) [16] extended_type)
extends Box(boxtype, extended_type) {
    unsigned int(8) version = v;
    bit(24)    flags = f;
}
``` where the extended type provides the value of a UUID to identify the vendor specific definition of the full box when the boxtype is defined to 'uuid'. This allows reusing the existing extension mechanism defined in the basic box for a full box. This allows also to benefit from a generic mechanism to manage versions and flags for user extended box.

As another alternative, a new boxtype 'fuid' may be defined to signal that a FullBox-based vendor-specific box contains a UUID that identifies the corresponding definition for the content of the user extended box. Accordingly, an extended FullBox is defined as below:

```
aligned(8) class ExtendedFullBox(unsigned int(32) boxtype,
    unsigned int(8) v, bit(24) f,
    optional unsigned int(8) [16] extended_ type)
extends FullBox (boxtype, v, f) {
    // Start with usual attributes of a FullBox
    if (boxtype =='fuid') {
        unsigned int(8) [16] usertype = extended_type;
    }
}
```

A derivation mechanism may be applied to 'pict' defined in HEIF 23008-12 or 'vide' tracks defined in ISOBMFF 14496-12. For being able to perform it, "derived tracks" are defined in ISOBMFF 14496-12 Technologies under Consideration. A derived track comprises derived samples, which are defined as a list of transformation operators to be applied to one or more input images (image items or images from another 'pict' or 'vide' track). Transformation operators may be transformations like 'crop' or 'irot' for example. Derived samples are defined and stored in media data ('mdat') boxes and described in metadata boxes (under 'trak' or 'traf' boxes hierarchy e.g. in sample table ('stbl') box).

The derived track is a track identified as a track having sample entries of type 'dtrk' and/or having a track reference container 'tref' of type 'dtrk' to input sources (either tracks or items).

A derived sample is defined as a container for a list of transformation operators to be applied to one or more input images. Each transformation operator is defined by at least one property designated by a TransformProperty box describing one or more operations to be performed on one or more input images.

It provides a list of inputs identifying the one or more input images (for example, index to the TrackReferenceTypeBox 'tref' referencing the identifier of an input track (track_ID) or the identifier of an input image item (item_ID)).

A specific index value '0' allows indicating that the input to a transformation operator is the output of a previous operation, in case of several succeeding operations. This index value is useful when the order of inputs is meaningful for a transformative operation.

In addition, each transformation operator may provide a sample_offset as an input. The sample_offset provides the offset of the sample (positive or negative) with respect to the decode time of the derived sample. This sample_offset is useful when an input track is not time-aligned with other tracks or to select a given sample in an image sequence ('pict') track for which the timing is only advisory (in such track timing information should be ignored by players).

Each transformation operator contains a parameter 'essential', which indicates, when set to 1, that the associated property is essential, otherwise it is not essential. This means that a reader parsing the file and running through an unknown transformation operator marked as essential triggers an error and stop the parsing of the derived track. A reader parsing the file and running through a unknown transformation operator marked as non essential can simply ignore and skip the unknown transformation operator and continue the parsing.

Samples of a derived track are used to store transformation operators. At track level, this is signaled by a specific VisualSampleEntry type: the DerivedVisualSampleEntry 'dtrk'.

Sample entries of type 'dtrk' includes a derived track configuration record DerivedTrackConfigRecord( ) that provides configuration information on the derived track that may be defined as follows:

```
Box Type:       DerivedTrackConfigRecord
Container:      DerivedTrackSampleEntry
Mandatory:      Yes in a track containing a DerivedTrackSampleEntry
Quantity:       One
aligned(8) class DerivedTrackConfigRecord( ) extends Box ('dtrC')
{
    unsigned int(3) entity_byte_len_minus1;
    unsigned int(2) derivation_method;
    unsigned int(1) sample_offset_flag;
    unsigned int(2) sample_offset_byte_len_minus1;
    unsigned int(32) operation_4cc[ ]; // until the end of the
box;
}
```

Where entity_byte_len_minus1 plus 1 indicates the number of bytes used in certain syntax elements of the sample structure of derived samples.

derivation_method indicates the derivation method to be used for determining the timing and number of output samples. When equal 0, the timing and number of output samples correspond to the temporal combination of samples of any of all input tracks or of the derived track itself (default behavior). When equal 1, the timing and number of output samples are aligned to the input track provided by a track reference of type 'ctln' (for Composition TimeLiNe) or any other type value with similar meaning. When equal 2, the timing and number of output samples are defined by an EditListBox associated to the derived track. When equal 3, the timing and number of output samples are aligned with the samples of the derived track.

sample_offset_flag equal to 0 specifies that sample_offset is not present in the sample format and the value of sample_offset is inferred to be equal to 0. sample_offset_flag equal to 1 specifies that sample_offset is present in the sample format, when an image sequence track is referenced.

sample_offset_byte_len_minus1 indicates the number of bytes for the sample_offset field in the sample structure of derived samples, when present.

operation_4cc[ ] is an array of zero or more four-character codes, each of which identifies a transformation operator.

In particular, it includes an array, denoted operation_4 cc, of zero or more four characters codes (also known as 4CC), each of which identifies a transformation operator that may be used in one or more of the samples of the derived track. Thanks to this array, when a player parses a sample entry of a derived track, it can know before parsing any samples if it can support or not all transform operators used by the samples of the derived track. This array is efficiently encoded in memory by concatenating all four-character codes until the end of the bounding box.

As being able to know which transformation operators are used in the derived track by parsing the derived track sample entry, the information according to which each described transformation operator is essential is not known. This information is useful to determine if the derived track can be decoded as an unknown transformation operator that is essential leads to a non-decodable derived track, while an unknown transformation operator that is not essential does not prevent the decoding of the derived track.

In an embodiment, the essential bit associated to each transformation operator is expressed in sample entry. The DerivedTrackConfigRecord( ) may include two arrays, one listing essential transformation operator 4CCs and another one listing non-essential transformation operator 4CCs as described below:

```
aligned(8) class DerivedTrackConfigRecord( ) extends Box ('dtrC')
{
    unsigned int(3) entity_byte_len_minus1;
    unsigned int(2) derivation_method;
    unsigned int(1) sample_offset_flag;
    unsigned int(2) sample_offset_byte_len_minus1;
    unsigned int(32) essential_operation_count;
    unsigned int(32)
    essential_operation_4cc[essential_operation_count];
    unsigned int(32) non-essential_operation_4cc[ ]; // until the end
    of the box;
}
```

Any transformation operator that would be marked as essential in any one of the samples of the derived track shall be listed in the array essential_operation_4 cc[ ]. Otherwise, it shall be listed into the array non-essential_operation_4 cc[ ].

essential_operation_count provides the number of entries in the first array essential_operation_4 cc[ ]. The second array non-essential_operation_4 cc[ ] ends with the end of the bounding box.

According to this embodiment, a reader parsing the file is able to determine from the parsing of the sample entry if it can decode the derived track without needing to parse any data sample.

It may be advantageous to provide a mean for handling vendor-specific or proprietary transformation operators. Proprietary or vendor-specific transformation operators refers to transformation operators that are not defined in the standard. A proprietary or vendor-specific transformation operator may be described using a 'uuid' box including an UUID extended type. The vendor uses a different uuid for each proprietary transformation operator that need to be defined.

Figure 3:
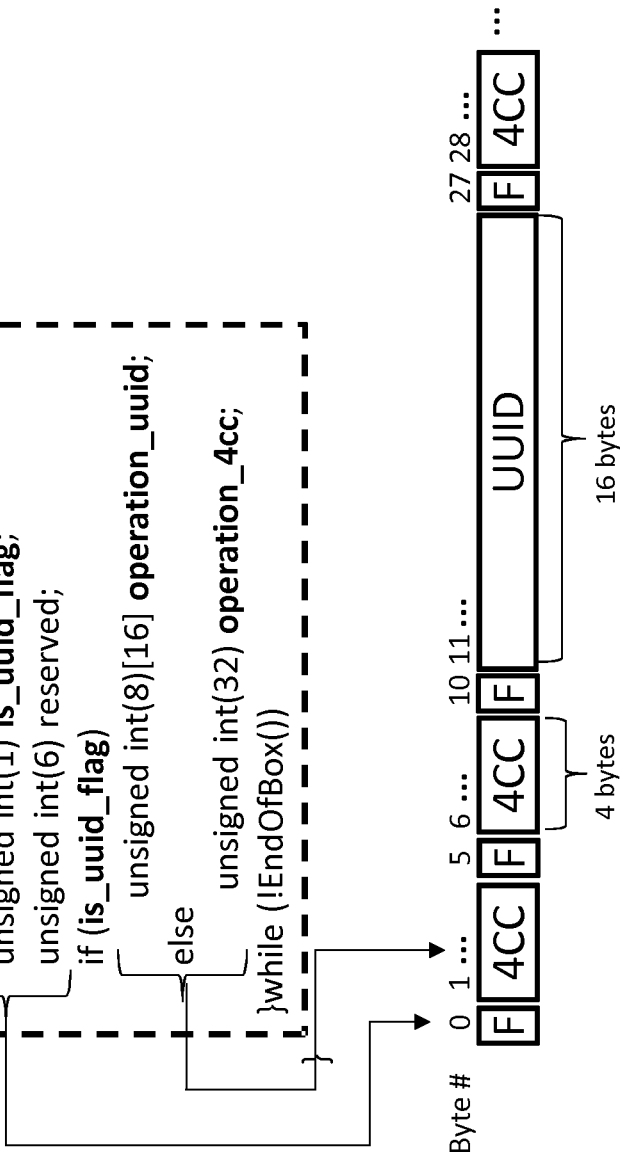
FIG. 3 illustrates the description of transformation operator in a derived track configuration record according to an embodiment of the invention.

In an embodiment, illustrated by FIG. 3, the DerivedTrackConfigRecord( ) is modified as follows:

```
aligned(8) class DerivedTrackConfigRecord( ) extends Box ('dtrC')
{
  unsigned int(3) entity_byte_len_minus1;
  unsigned int(2) derivation_method;
  unsigned int(1) sample_offset_flag;
  unsigned int(2) sample_offset_byte_len_minus1;
  do {
    unsigned int(1) essential;
    unsigned int(1) is_uuid_flag;
    unsigned int(6) reserved;
    if (is_uuid_flag == 1)
      unsigned int(8)[16] operation_uuid;
    else
      unsigned int(32) operation_4cc;
  }while (!EndOfBox( ))
}
``` with the following semantics:
essential when set to 1 indicates that the transform property is essential, otherwise it is non-essential.
is_uuid_flag equal to 1 indicates that the transform property code that follows is a 16-byte UUID (universal unique identifiers). Otherwise the transform property code that follows is a 4-byte 4CC.
operation_uuid is a 16-byte UUID code that identifies the extended type of a vendor-specific 'uuid' transform property.
operation_4 cc is a four-characters code that identifies a normative transform property.

An operation may be either essential or non-essential. A parser shall not process a derived track that contains an operation marked as essential that is not recognized or not supported by the parser. A parser may ignore an operation that is marked as non-essential. When a non-essential operation is ignored, the output of the previous operation is used into the next operation as an input (with index value 0). When more than one operation is listed in a derived sample:
the first operation can't have multiple-input if this first operation is marked as non-essential, and
if a first single-input operation is marked as non-essential and is ignored, its input is used into the next operation as an input (with index value 0).

Advantageously, this embodiment allows signaling in a compact way (single loop) essential and non-essential, as well as normative transformation operators identified by a four characters code and proprietary transformation operators identified with a UUID.

In an alternative to above embodiments, all essential transformation operators are listed first so the player can stop its parsing earlier and ignore the derived track if it encounters an unknown transformation operator marked as essential.

In other alternative to above embodiments, all essential proprietary transformation operators are listed first because they represent a highest probability to not be supported by a player, they are then followed by essential normative transformation operators and finally non-essential transformation operators. Thus, a player can know more rapidly if a derived track can be processed or not.

In other alternative to above embodiments, rather than defining a is_uuid_flag flag to distinguish between proprietary and normative transformation operators, all 4CC corresponding to normative transformation operators are listed first and a separator is used to signal that following transformation operators are proprietary transformation operators identified by a 16-byte universally unique identifier (UUID). In such case, the normative 4CC 'uuid' may be used as separator.

In other alternative to above embodiments, only proprietary and normative transformation operators are signaled without essential/non-essential information.

Figure 4:
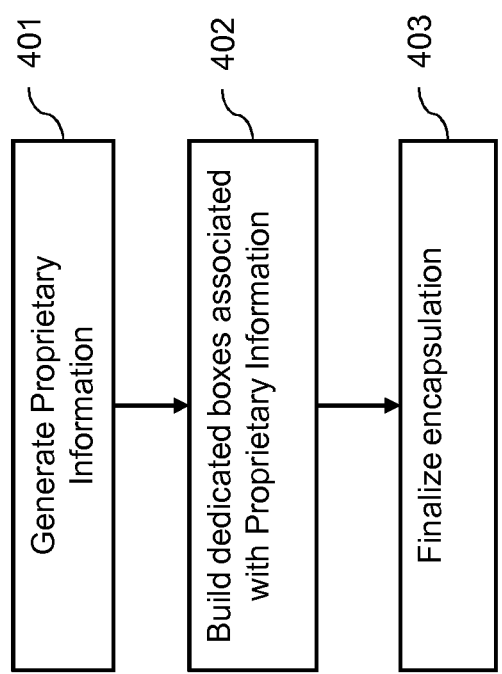
FIG. 4 illustrates the main steps of encapsulation of images in a file format such as HEIF according to an embodiment of the invention.

FIG. 4 illustrates the main steps of encapsulation of images in a file format such as HEIF or ISOBMFF according to an embodiment of the invention. First, the encapsulation process starts by the generation of Proprietary information in a step 401. The proprietary information can correspond to proprietary types of grouping of items or tracks as described in relation to FIG. 2, or proprietary transformation operators as described in relation to FIG. 3.

Then, in a step 402, a HEIF, or ISOBMFF, writer builds the entity to group boxes or the derived track configuration records for which the Proprietary Information applies. At the end of this step the HEIF, or ISOBMFF, file description box content is finalized.

In a last step 403, the item data (e.g. image samples or text samples, etc.) is encapsulated in the file.

Figure 5:
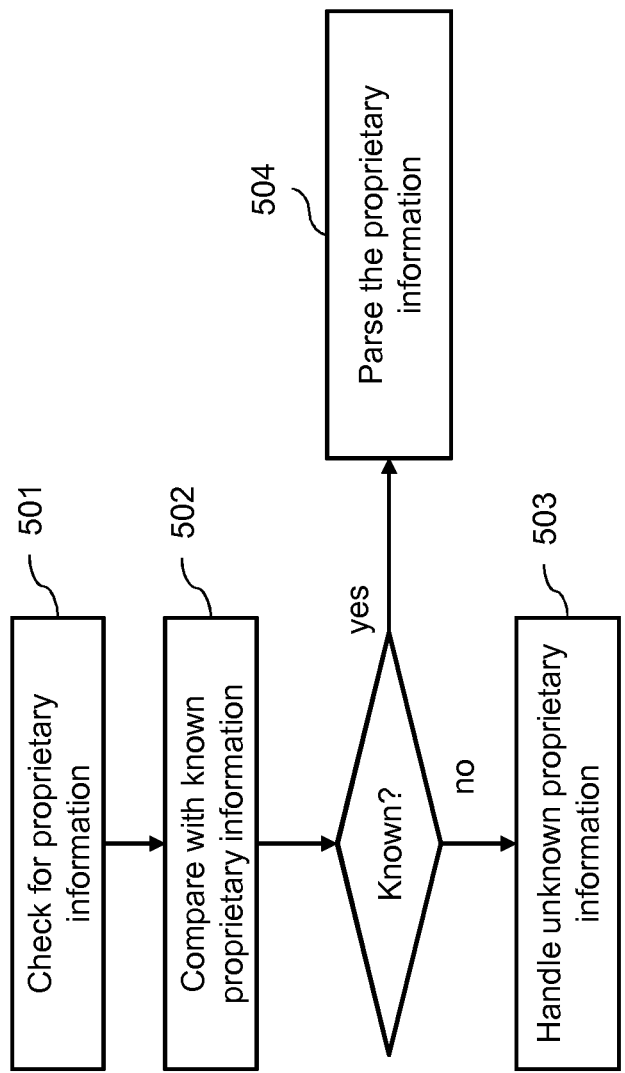
FIG. 5 illustrates the main steps of a parsing algorithm to read a file according to embodiments of the invention.

FIG. 5 illustrates the main steps of a parsing algorithm to read a file according to embodiments of the invention.

In a step 501 the HEIF or ISOBMFF file is parsed. In particular, the reader checks the presence of any proprietary information in the file. According to embodiments, the proprietary information may correspond to proprietary grouping types of entities or derived tracks with proprietary transformation operators. If a derived track is present, the reader parses the sample entry in the metadata part describing the derived track. The reader checks for the presence of any unknown transformation operator that is marked as essential. The presence of proprietary information means that uuids are present in the file as extended grouping type identifiers or as transformation operator identifiers.

In a step 502, the reader compares any uuids found in the file with uuids it knows.

If the comparison is positive, meaning that the proprietary information is from a known manufacturer, the reader is able to parse the proprietary information in a step 504.

If the comparison is negative, meaning that the proprietary information is from an unknown manufacturer, a step 503 is executed to handle the unknown proprietary information. For example, if the unknown proprietary information concerns an unknown grouping type of entities, the grouping may simply be ignored. In another example, if the unknown proprietary information concerns a proprietary transformation operators, the reader checks if the unknown transformation operator is marked as essential for the decoding of a derived track. If it is marked as essential, then the reader triggers an error and the derived track containing the unknown transformation operator cannot be decoded. If the unknown transformation operator is not marked as essential, it can be simply ignored and the derived track can be decoded by skipping the unknown transformation operator when generating the samples of the derived track.

Figure 6:
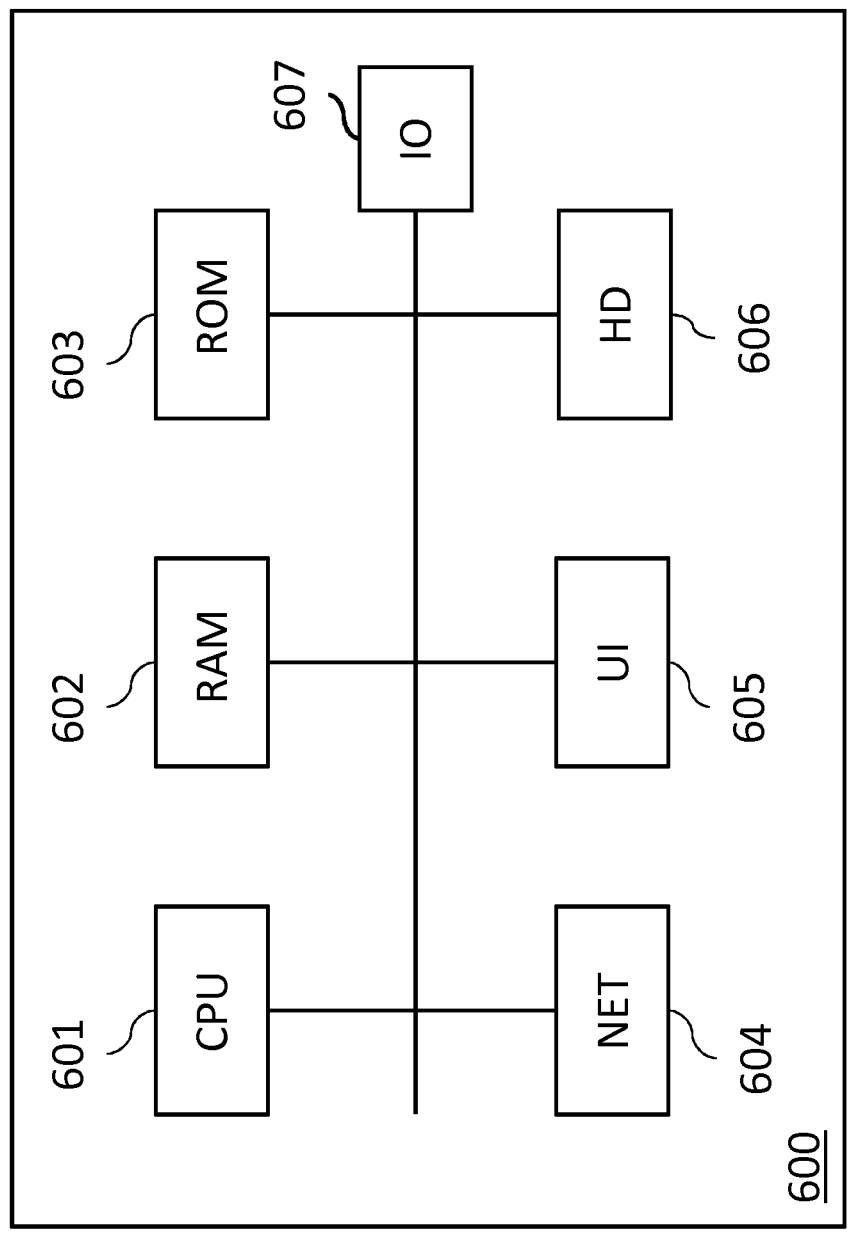
FIG. 6 is a schematic block diagram of a computing device for implementation of one or more embodiments of the invention.

FIG. 6 is a schematic block diagram of a computing device 600 for implementation of one or more embodiments of the invention. The computing device 600 may be a device such as a micro-computer, a workstation or a light portable device. The computing device 600 comprises a communication bus connected to:
- a central processing unit 601, such as a microprocessor, denoted CPU;
- a random access memory 602, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port for example;
- a read only memory 603, denoted ROM, for storing computer programs for implementing embodiments of the invention;
- a network interface 604 is typically connected to a communication network over which digital data to be processed are transmitted or received. The network interface 604 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 601;
- a user interface 605 may be used for receiving inputs from a user or to display information to a user;
- a hard disk 606 denoted HD may be provided as a mass storage device;
- an I/O module 607 may be used for receiving/sending data from/to external devices such as a video source or display.

The executable code may be stored either in read only memory 603, on the hard disk 606 or on a removable digital medium such as for example a disk. According to a variant, the executable code of the programs can be received by means of a communication network, via the network interface 604, in order to be stored in one of the storage means of the communication device 600, such as the hard disk 606, before being executed.

The central processing unit 601 is adapted to control and direct the execution of the instructions or portions of software code of the program or programs according to embodiments of the invention, which instructions are stored in one of the aforementioned storage means. After powering on, the CPU 601 is capable of executing instructions from main RAM memory 602 relating to a software application after those instructions have been loaded from the program ROM 603 or the harddisc (HD) 606 for example. Such a software application, when executed by the CPU 601, causes the steps of the flowcharts of the invention to be performed.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Fiel4Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encapsulating at least one image in a file, wherein the method comprises for the at least one image:
generating at least one property data structure associated with the at least one image, and comprising information of a universal unique identifier;
generating an item property container data structure comprising the at least one property data structure;
generating an item property association data structure comprising at least one association information, each association information associating an item identifier identifying an image with a property identifier; and
encapsulating the at least one property data structure, the item property container data structure, the item property association data structure, and the at least one image in the file.

2. The method of claim 1, wherein the at least one property data structure is a descriptive property data structure comprising proprietary information not affecting rendering of the at least one image.

3. The method of claim 1, wherein the at least one property data structure is a transformative property data structure comprising proprietary information affecting rendering of the at least one image.

4. The method of claim 1, wherein the at least one property data structure comprises (1) a vendor name identifier identifying a vendor and (2) a parameter identifying a type of proprietary information related to the at least one image.

5. The method of claim 1, wherein the at least one property data structure comprises (1) a vendor name identifier identifying a vendor and (2) a parameter identifying a type of a property.

6. The method of claim 1, wherein the at least one property data structure comprises a further parameter to indicate whether a property is essential for the associated image.

7. The method of claim 1, wherein the method further comprises:
generating syntax parameters describing a syntax of proprietary information related to the at least one image; and
encapsulating the syntax parameters in the at least one property data structure.

8. The method of claim 3, wherein an image type defining the at least one image indicates that the at least one image is an image to which transformative properties have been applied.

9. The method of claim 1, wherein property data of the at least one property data structure is stored in a data part of the file, the at least one property data structure comprising a reference to the property data in the data part of the file.

10. A method of reading at least one image in a file, wherein the method comprises for the at least one image:
reading the at least one image;
reading an item property container data structure comprising at least one property data structure;
reading an item property association data structure comprising at least one association information, each association information associating an item identifier identifying an image and a property identifier; and
reading the at least one property data structure associated with the at least one image, the at least one property data structure comprising information of a universal unique identifier.

11. The method of claim 10, wherein the at least one property data structure is a descriptive property data structure comprising proprietary information not affecting rendering of the at least one image.

12. The method of claim 10, wherein the at least one property data structure is a transformative property data structure comprising proprietary information affecting rendering of the at least one image.

13. The method of claim 10, wherein the at least one property data structure comprises (1) a vendor name identifier identifying a vendor and (2) a parameter identifying a type of proprietary information related to the at least one image.

14. The method of claim 10, wherein the at least one property data structure comprises (1) a vendor name identifier identifying a vendor and (2) a parameter identifying a type of a property.

15. The method of claim 10, wherein the at least one property data structure comprises a further parameter to indicate whether a property is essential for the associated image.

16. The method of claim 10, wherein the method further comprises:
reading syntax parameters encapsulated in the at least one property data structure and describing a syntax of proprietary information related to the at least one image; and
controlling a parser to parse the proprietary information based on the syntax parameters.

17. The method of claim 16, further comprising displaying the proprietary information.

18. The method of claim 12, wherein an image type defining the at least one image indicates that the at least one image is an image to which transformative properties have been applied.

19. The method of claim 10, wherein property data of the at least one property data structure is stored in a data part of the file, the at least one property data structure comprising a reference to the property data in the data part of the file.

20. A non-transitory computer-readable storage medium storing instructions of a computer program for performing a method according to claim 1.

21. A non-transitory computer-readable storage medium storing instructions of a computer program for performing a method according to claim 10.

22. A processing device performing a method according to claim 1.

23. A processing device performing a method according to claim 10.

* * * * *